United States Patent
Önder et al.

(10) Patent No.: US 6,982,511 B2
(45) Date of Patent: Jan. 3, 2006

(54) POLE RING

(75) Inventors: Ismail Önder, Berlin (DE); Isao Fukumoto, Berlin (DE)

(73) Assignee: Pierburg GmbH, Neuss (DE)

( * ) Notice: Subject to any disclaimer, the term of this patent is extended or adjusted under 35 U.S.C. 154(b) by 0 days.

(21) Appl. No.: 10/647,952

(22) Filed: Aug. 26, 2003

(65) Prior Publication Data

US 2004/0041487 A1  Mar. 4, 2004

(30) Foreign Application Priority Data

Aug. 27, 2002 (DE) ................................ 102 39 121

(51) Int. Cl.
  *H02K 1/17* (2006.01)
  *H02K 1/18* (2006.01)

(52) U.S. Cl. .................... 310/91; 310/89; 310/154.01; 310/154.03; 310/154.08; 310/154.15

(58) Field of Classification Search ............... 310/91, 310/89, 85, 86, 154.01, 154.03, 154.04, 154.05, 310/154.08, 154.09, 154.12, 154.14, 154.15, 310/154.16

See application file for complete search history.

(56) References Cited

U.S. PATENT DOCUMENTS

| 3,772,546 A | * | 11/1973 | Means ................... 310/154.16 |
| 4,881,001 A | * | 11/1989 | Patel et al. ................. 310/258 |
| 5,057,730 A | * | 10/1991 | Yoshida ....................... 310/91 |
| 5,481,148 A | * | 1/1996 | Moribayashi et al. .. 310/154.16 |
| 6,774,518 B2 | * | 8/2004 | Howe et al. .................. 310/89 |

FOREIGN PATENT DOCUMENTS

| DE | 1879137 U1 | 9/1963 |
| DE | 8137239 U1 | 7/1982 |
| DE | 19859065 A1 | 6/2000 |
| FR | 1.085.443 | 2/1995 |

\* cited by examiner

*Primary Examiner*—Darren Schuberg
*Assistant Examiner*—Leda T. Pham
(74) *Attorney, Agent, or Firm*—Ohlandt, Greeley, Ruggiero & Perle, L.L.P.

(57) ABSTRACT

A pole ring suitable for d.c. motors is provided. The pole ring includes several retaining projections provided at the outer circumference for the secure retainment in a motor housing. The retaining projections have retaining surfaces pointing oppositely to the mounting direction. The retaining surfaces affix the vole ring in the soft material, such as aluminum diecasting or plastic, for example, of the motor housing.

11 Claims, 2 Drawing Sheets

POLE RING

BACKGROUND OF THE INVENTION

1. Field of the Invention

The invention relates to a pole ring, particularly for d.c. motors. Further, the invention relates to an electric motor with a pole ring according to the invention. This motor is particularly suitable for controlling throttle, tumble valves and the like.

2. Discussion of the Background Art

A plurality of electric motors is used in motor vehicles. Particularly electric motors which are used, for example, for the control of valves such as throttle or tumble valves in the region of the internal combustion engine of the motor are often subject to high temperature variations. When using such electric motors in large temperature ranges, it has to be ensured that the pole ring of the electric motor is securely fixed in the entire temperature range. Even a slight turning or slipping of the pole ring may lead to a variation of the course of the magnetic field lines and thus to an impairment of the motor characteristics.

It is known to configure pole rings in a slitted manner, i.e., to provide them with a longitudinal slit to be able to compress the pole ring upon mounting, i.e., upon insertion into the motor housing. After mounting, a pole ring slitted in this manner effects a sufficient surface pressure to be securely fixed in the housing even with relatively large temperature variations. Slitted pole rings, however, are disadvantageous in that the course of the magnetic field lines is impaired by the slit. Further, mounting such pole rings that have to be compressed upon insertion into the housing is troublesome.

SUMMARY OF THE INVENTION

It is the object of the invention to provide a pole ring that is also securely held in the motor housing in case of large temperature variations.

The pole ring according to the invention, which is particularly suitable for a D.C. motor, has several retaining projections at the outer circumference. In case of a conventionally circular cylindrical pole ring, the projections are hence provided at the outer surface. The retaining projections serve to securely retain the pole ring in a motor housing. The retaining projections are wedge-shaped, for example. With such retaining projections, it is also possible to insert the pole ring into a smooth cylindrical recess of the motor housing. In a motor housing of a relatively soft material, an aluminum diecast housing or a plastic housing, for example, the retaining projections according to the invention push into the housing and thus lead to a good fixation of the pole ring. According to the invention, the retaining projections comprise retaining surfaces pointing oppositely to the mounting direction. In case of a wedge-shaped retaining projection, this means that the wedge points in mounting direction, i.e., in longitudinal direction of the pole ring, and the rear side of the wedge-shaped retaining projection serves as a retaining surface.

With the pole ring according to the invention, it is thus possible to simply produce electric motors useable in a large temperature range. When using the pole ring according to the invention, temperature variations of from −40° C. (−40 F) to +160° C. (320 F) are possible in particular without the pole ring getting loose.

Preferably, the retaining surface has a sharp edge pointing outward, i.e., away from the pole ring. This sharp edge forms a kind of ridge whereby the pole ring is retained even better in the motor housing.

Preferably, the retaining surfaces of at least a part of the retaining projections extend substantially radially to the pole ring. Here, a deviation from a radial course of less than ±5° is preferred. It is preferred to slightly incline the retaining surfaces so that they are slightly inclined backwards opposite to the mounting direction so that the outer edge is arranged farther behind in longitudinal direction than the edge of the retaining surface which forms the connection line between the outer surface of the pole ring and the retaining surface.

Preferably, the retaining projections located behind in mounting direction are arranged so as to be angularly offset in circumferential direction with respect to the retaining projections in front in mounting direction. This has the advantage that shorter scoring traces and thus a better retainment is possible.

Further, the course of the pressing-in force is improved so that an easier mounting is realized. Further, the invention relates to an electric motor with a rotor arranged in a housing and a pole ring surrounding the rotor. According to the invention, the pole ring is configured as described above or embodied in the way described with reference to the Figures.

Further, a bearing, typically a ball bearing, for bearing the rotor shaft is arranged in the housing. Preferably, a retaining disc for fixing the position of the bearing is provided in the housing. Here, the retaining disc extends such that it is fixed by the pole ring. The provision of a retaining disc for fixing the bearing, which, according to the invention, is retained by the pole ring, represents an independent invention being independent of the configuration of the pole ring itself.

BRIEF DESCRIPTION OF THE DRAWINGS

Hereinafter, the invention is explained in detail with respect to a preferred embodiment thereof with reference to the accompanying drawings.

In the Figures.

DETAILED DESCRIPTION OF THE PREFERRED EMBODIMENT

Figure 1:
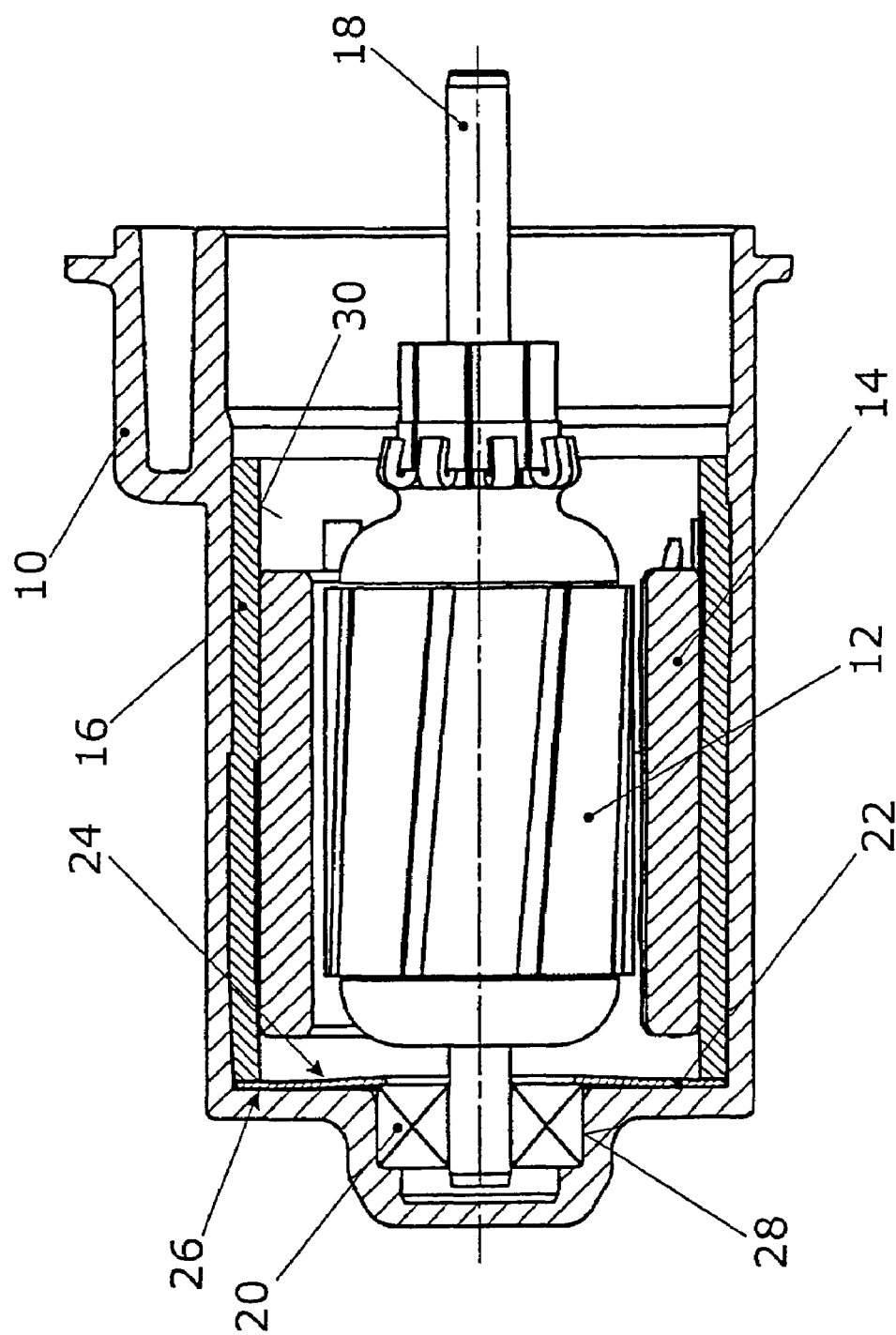
FIG. 1 shows a schematic sectional view of an electric motor (d.c. motor)

An electric motor arranged in a housing 10 comprises a rotor 12 surrounded by a stator 14 and a pole ring 16 fixed in the housing. The rotor 12 is connected with a rotor shaft 18 being borne in the housing 10 via a bearing 20. The bearing 20 is axially fixed by means of a retaining disc 22. The retaining disc 22 is an annular disc with an inner portion 24 contacting the bearing 20 and an outer portion 26 contacting the pole ring 16.

For mounting, the retaining disc 22 arranged substantially radially to the rotor shaft 18 is pushed upon the rotor shaft 18. Subsequently, the ball bearing 20 is pressed onto the rotor shaft 18. The rotor shaft 18 to which, conventionally, the rotor 12 is already connected is then inserted into the housing 10 together with the retaining disc 22 and the bearing 20 so that the bearing 20 is arranged in a bearing receptacle of the housing 28, as shown in FIG. 1. Then, according to the invention, the pole ring 16 is pressed into a cylindrical portion 30 of the housing 10. The fixation of the pole ring 16 in a housing 10 thus simultaneously serves to fix the position of the retaining disc 22 and thus to axially fix the bearing 20. A separate complicated axial fixation of the bearing 20 which is, for example, a ball bearing, is thus not necessary.

Figure 3:
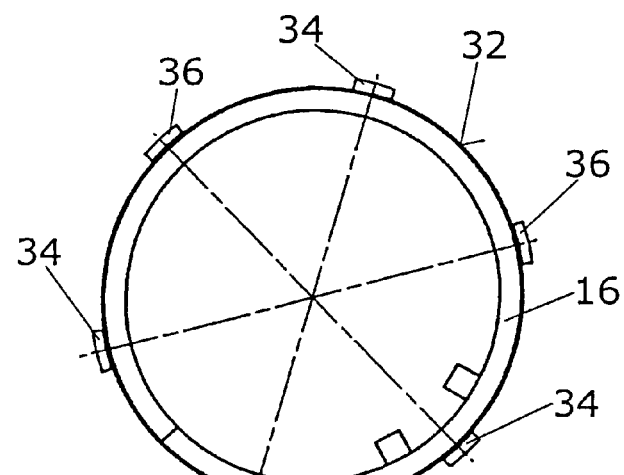
FIG. 3 shows a schematic front view of the pole ring.

According to the invention, the pole ring 16 comprises several retaining projections 34,36 at its outer circumference 32 (FIG. 3). The retaining projections 34,36 are wedge-shaped and formed as a bead, respectively. According to the invention, the retaining projections 34,36 have a retaining surface 40 pointing oppositely to the mounting direction 38. The retaining surface 40 extends substantially radially to the pole ring 16 and vertically to the mounting direction 38, respectively. Each retaining surface 40 has a sharp edge 42 pointing away from the outer circumferential surface 32.

The retaining projections 34,36 are made by pressing-in the recesses 44 at the inside of the pole ring 16.

Figure 2:
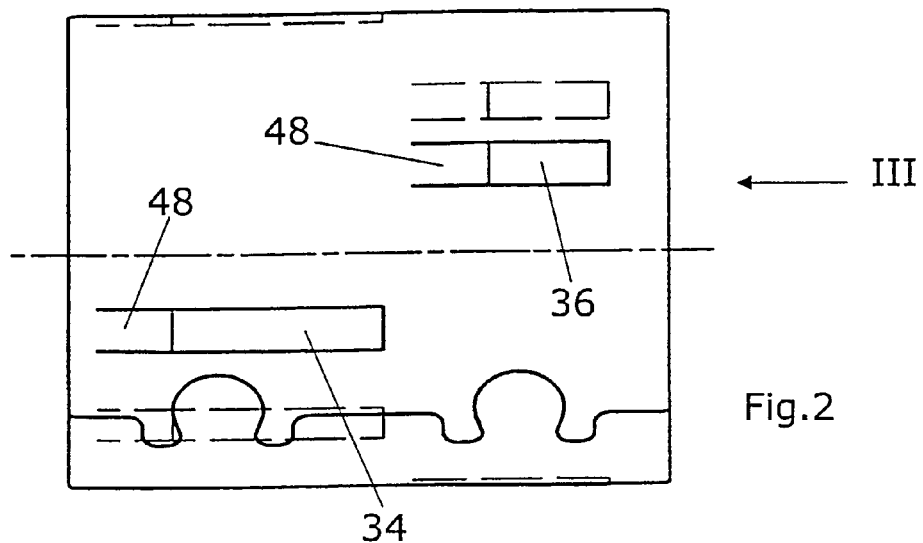
FIG. 2 shows a schematic side view of the pole ring.

In the mounting direction 38 corresponding to the longitudinal direction of the pole ring 16, the pole ring has an entering chamfer 46 at its front side. It serves to facilitate the mounting upon mounting the pole ring 16, i.e., upon pressing-in into the housing 10. Further, each retaining projection 34,36 comprises a guiding chamfer 48 in order to also facilitate the mounting (FIG. 2).

Figure 4:
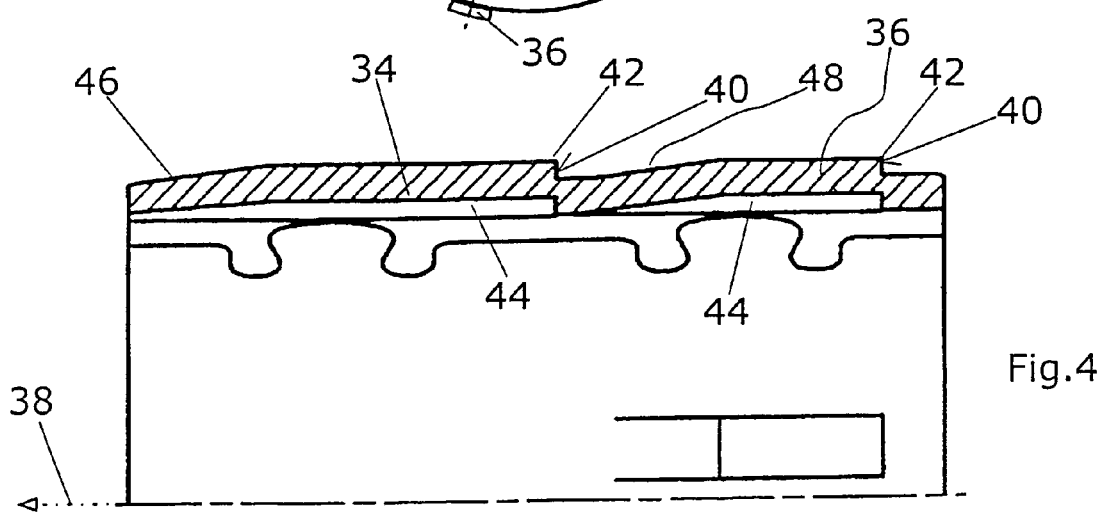
FIG. 4 shows a schematic partial longitudinal section of the pole ring.

The length of the individual retaining projections or beads 34,36 corresponds to half the length of the pole ring 16 at maximum. Preferably, front retaining projections 34 and rear retaining projections 36 are provided which are arranged along the circumference 32 of the pole ring 16 in a mutually offset manner (FIG. 3). The front retaining projections 34 and the rear retaining projections 36 are arranged in a mutually offset manner and behind each other at the same time, the rear retaining projection 36 in FIG. 4 being turned into the plane of the drawing for the purpose of clarification.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

What is claimed is:

1. A pole ring for a D.C. motor housing, comprising:
several retaining projections provided at an outer circumference, said retaining projections radially securing and axially retaining the pole ring in the D.C. motor housing, the retaining projections comprising a retaining surface pointing oppositely to a mounting direction for mounting the pole ring in the D.C. motor housing, wherein each of the retaining projections has a guiding chamfer.

2. The pole ring of claim 1, wherein said retaining surfaces have a sharp edge pointing radially outward.

3. The pole ring of claim 1, wherein said retaining surfaces extend substantially radially.

4. The pole ring of claim 1, wherein said retaining projections extend in a longitudinal direction.

5. The pole ring of claim 1, further comprising a wherein the guiding chamfer faces the mounting direction.

6. The pole ring of claim 1, wherein each of the retaining projections extends no more than half the length of the pole ring.

7. The pole ring of claim 1, wherein the retaining projections comprising a set of front retaining projections facing the mounting direction and a set of rear retaining protections axially offset behind the front retaining projections, said front retaining projections being angularly offset with respect to the front retaining projections in circumferential direction.

8. A Dole ring for a D.C. motor housing, comprising:
several retaining projections provided at an outer circumference, said retaining projections radially securing and axially retaining the pole ring in the D.C. motor housing, the retaining projections comprising a retaining surface pointing oppositely to a mounting direction for mounting the Pole ring in the D.C. motor housing, wherein at least two retaining projections are mutually offset in circumferential direction of the pole ring.

9. An electric motor, comprising:
a motor housing of a soft material; and
a pole ring having a plurality of retaining projections provided at an outer circumference, wherein the plurality of retaining projections push into the soft material of the motor housing during mounting so that the plurality of retaining projections radially secure and axially retain the pole ring in the motor housing, wherein each of the plurality of retaining projections has a guiding chamfer facing a direction for mounting the pole ring in the motor housing.

10. The electric motor of claim 9, wherein the plurality of retaining projections comprise a retaining surface pointing opposite to the direction for mounting the pole ring in the motor housing.

11. The electric motor of claim 10, wherein said retaining surfaces have a sharp edge pointing radially outward.

* * * * *